United States Patent [19]

Salter et al.

[11] Patent Number: 4,619,814

[45] Date of Patent: * Oct. 28, 1986

[54] PROCESS FOR THE RECOVERY OF NON-FERROUS METALS FROM SULPHIDE ORES AND CONCENTRATES

[75] Inventors: Robert S. Salter; Roy S. Boorman, both of Fredericton, Canada; Igor A. E. Wilkomirsky, Concepcion, Chile

[73] Assignee: Provincial Holdings Ltd., Fredericton, Canada

[*] Notice: The portion of the term of this patent subsequent to Sep. 23, 1997 has been disclaimed.

[21] Appl. No.: 530,032

[22] Filed: Sep. 7, 1983

Related U.S. Application Data

[63] Continuation-in-part of Ser. No. 346,837, Feb. 5, 1982, Pat. No. 4,415,540, which is a continuation of Ser. No. 189,249, Sep. 22, 1980, Pat. No. 4,317,803, which is a continuation of Ser. No. 940,937, Sep. 11, 1978, Pat. No. 4,224,122.

[30] Foreign Application Priority Data

Dec. 3, 1982 [CA] Canada ................................ 416971

[51] Int. Cl.⁴ .......................... C01G 3/10; C01G 9/06
[52] U.S. Cl. ........................................ 423/27; 423/41; 423/45; 423/98; 423/99; 423/109; 423/148; 423/150; 423/DIG. 2; 423/DIG. 16
[58] Field of Search ................... 423/98, 99, 104, 148, 423/150, DIG. 2, DIG. 16, 27, 41, 45

[56] References Cited

U.S. PATENT DOCUMENTS

| | | | |
|---|---|---|---|
| 1,634,100 | 6/1927 | Gepp et al. ........................... | 423/99 |
| 2,155,119 | 4/1939 | Ebner ........................... | 423/DIG. 2 |
| 3,053,626 | 9/1962 | Patterson ...................... | 423/DIG. 2 |
| 3,181,944 | 5/1965 | Brook et al. ........................... | 423/99 |
| 3,230,071 | 1/1966 | Marvin ................................. | 423/99 |
| 3,676,107 | 7/1972 | Barnard et al. ............... | 423/DIG. 2 |
| 3,745,207 | 7/1973 | Hansen ......................... | 423/DIG. 2 |
| 4,071,612 | 1/1978 | Weyer et al. ................. | 423/DIG. 16 |
| 4,224,122 | 9/1980 | Wilkomirsky et al. ............... | 423/99 |
| 4,317,803 | 3/1982 | Wilkomirsky et al. ............... | 423/99 |
| 4,415,540 | 11/1983 | Wilkomirsky et al. ............... | 423/99 |

OTHER PUBLICATIONS

G. R. Smithson, Jr., and J. E. Hanway, Jr., Trans. of the Metallurgical Soc. of AIME, vol. 224, 827–834, Aug. 1967.
G. Steinveit, AIME World Symposium of Mining & Metallurgy of Lead and Zinc, vol. II, 223–246 (1970).
E. Moriyama and Y. Yamamoto, AIME World Symposium of Mining & Metallurgy of Lead and Zinc, vol. II, 199–222 (1970).

Primary Examiner—H. T. Carter
Attorney, Agent, or Firm—Ladas & Parry

[57] ABSTRACT

This invention relates to the development of a viable metallurgical process capable of treating low grade concentrates, bulk concentrates, dirty concentrates, or ore directly for the recovery of non-ferrous metals such as zinc, lead, copper, and precious metals and accordingly is significant to the development of massive fine grained sulphide ore bodies found throughout the world. The process involves the consecutive steps of sulphatizing roasting in a fluidized bed reactor, a two stage leach, metal recovery from solution by conventional processes such as electrowinning and precipitation, and recycling of residue wash waters and leach liquors containing high concentrations of iron and minor impurity elements to the roaster or a spray dryer for thermal decomposition. Simple and efficient rejection of iron from the circuit to residue as stable hematite is the net result of the recirculation and thermal decomposition. Recoveries of zinc and copper of greater than 90% for low grade ore and over 95% for concentrates have been obtained in pilot plant testing. Recoveries of lead, silver, gold of 98%, 90%, and 79% respectively are achievable.

25 Claims, 2 Drawing Figures

PROCESS FOR THE RECOVERY OF NON-FERROUS METALS FROM SULPHIDE ORES AND CONCENTRATES

This application is a continuation-in-part of Ser. No. 346,837, filed Feb. 5, 1982, now U.S. Pat. No. 4,415,540, which in turn is a continuation of Ser. No. 189,249, filed Sept. 22, 1980, now U.S. Pat. No. 4,317,803, which in turn is a continuation of Ser. No. 940,937, filed Sept. 11, 1978, now U.S. Pat. No. 4,224,122.

This invention relates to a process to recover non-ferrous metal such as zinc, lead, copper, and precious metals either directly from their ores or from bulk or dirty concentrates produced from their ores. The development of a viable metallurgical process which would be capable of treating low grade concentrates, bulk concentrates or the ore directly is of interest for massive fine grained sulphide ores found throughout the world.

Metallurgical processes presently in practice require concentrates of high grade in the metal for which the process was designed to recover. Decreases in grade of a few weight percent can make the processing uneconomic. Concentrations of other metal in these concentrates can make their treatment technically unfeasible. For example, lead concentration in zinc concentrates must be below 3 weight percent to be treated in conventional dead roast, electrolytic zinc plants. In addition, recoveries of these impurity metals are usually low in present metallurgical plants. Hence the value of the ore is significantly reduced when the ore responds poorly to conventional selective flotation practices for producing separate high grade concentrates. Such is the case for most of the world's fine grained massive sulphide ores. Poor recoveries to separate high grade concentrates and high cross-contamination in these concentrates have resulted in the development of only a few of the highest grade deposits.

This invention affords a solution to the problems impeding development in that relatively low grade concentrates including bulk concentrates or ore without preconcentration can be treated, with resultant high metal recoveries. The only requirements for the process are that smelter feed, either ore or concentrate be relatively sulphide rich and that magnesium and sodium be sufficiently low to avoid excessive buildups within the recycle stream in the process. Most ores and concentrates from massive sulphide orebodies will meet these requirements without pretreatment. Simple bulk flotation, gravity separation, or acid wash pretreatment will be required for some ores and concentrates.

This invention comprises improvements and refinements to the technology described in our U.S. Pat. No. 4,224,122 and corresponding Canadian Pat. No. 1,121,605, issued Apr. 13, 1982, extending its application to the treatment of high lead bearing ores and concentrates and lower grade zinc ore and concentrates. The disclosures of those patents are incorporated herein by reference. The earlier patents disclosed a method for recovering non-ferrous metals by thermal treatment of solutions containing non-ferrous and iron sulphates. It was a necessary condition of that invention that the non-ferrous metals to be recovered be soluble in sulphuric acid, thus restricting its application to such metals as zinc and copper, and other metals for which the sulphate salts and oxides are sulphuric acid soluble. The treatment of ores and concentrates containing large (>4 wt percent) amounts of lead in addition to acid soluble metals was not disclosed in this patent. Also, the invention as described in the earlier patents has difficulty in treating, economically, low grade concentrates and ores in that metal recoveries decrease rapidly when the grade of the ore or concentrate decreases below 20 wt percent combined acid soluble non-ferrous metal content.

The primary object of this invention is to provide a process for recovering zinc from sulphidic sources such as directly from ores and low-grade zinc-bearing concentrates regardless of zinc or iron contents and with less difficulty than previous methods involving complex iron-removal processing.

Another object of this invention is to provide such a zinc-recovering method as above, wherein the lead content of the ore or concentrate is not a process limiting parameter in that it does not affect the zinc-recovery method.

Yet another object of this invention is to provide such a zinc-recovering method as above, wherein other valuable non-ferrous metals such as lead, copper, silver, and gold present in the ores or concentrates are also rendered recoverable.

A further object of this invention is to provide a zinc-recovering method as above, wherein effective use of the potential energy contained within the sulphidic ores and concentrates is made.

A still further object of this invention is to provide a zinc-recovering method as above, wherein sulphur is recovered in a valuable form from the sulphidic sources.

The last object of this invention is to provide such a zinc-recovering method as above, wherein said method can be combined with a conventional dead roasting method to the overall benefit of the zinc recovery process.

In one aspect of this invention there is provided a method for recovering zinc from sulphidic ores and concentrates comprising (a) roasting said material in a subdivided form in a fluidized bed reactor at a temperature from 620° to 700° C., with 20–60% excess air over the stoichiometric for an average retention time of over 1 hour and at a superficial spacial velocity of the gas within the bed of 25–150 cm per sec at reactor temperature resulting in an atmospheric comprising $SO_2$, $SO_3$, water vapour, remaining $O_2$, and $N_2$ from the air, to obtain a calcine containing the zinc primarily as sulphates and oxysulphates and most of the iron as hematite;

(b) leaching said calcine with water or dilute sulphuric acid solution at a temperature below 80° C. in such a manner that the sulphates, oxysulphates, and oxides of zinc are leached out in part from the calcine into the water or dilute sulphuric acid solution;

(c) subjecting the leach pulp resulting from step (b) to a liquid-solid separation step to yield a leach solution suitable for purification-metal recovery steps for zinc;

(d) leaching the solid residue resulting from step (c) with hot, strong sulphuric acid solutions, at a temperature above 80° C. but below the boiling point of the solution and with sulphuric acid solution stronger than used in step (b), in such a manner that most of the zinc ferrite and unreacted sulphide of zinc are converted to the sulphates of iron and zinc which dissolve in the leach solution;

(e) subjecting the pulp resulting from step (d) to a solid-liquid separation step to obtain a leach solution containing said sulphates of iron and zinc;

(f) recycling said sulphates of zinc and iron obtained in step (e) in part into said fluidized bed reactor in a subdivided form to convert the sulphates of iron to hematite, $SO_2$ and $SO_3$;

(g) washing the solid residue resulting from step (e) with fresh water or recycled water or solutions;

(h) subjecting any pulp resulting from step (g) to a solid-liquid separation step to obtain a washed leach residue and a wash liquor containing zinc and iron sulphates and sulphuric acid; and (i) recycling said sulphates of zinc and iron resulting from step (h) in part to step (b) and/or in part to the said fluidized bed reactor in a subdivided form to convert the sulphates of iron to hematite, $SO_2$ and $SO_3$.

The reference throughout this specification and claims to the term "excess air" indicates the use of air, or oxygen-enriched air, or the like, as will be clear to any person skilled in the art. Excess air (oxygen) will thus provide the required 20 to 60% excess of oxygen over the stoichiometric requirements of the fluidized bed reactor system, for oxidation of the various components mentioned therein.

In a further aspect of this invention there is provided a method set forth in the immediately preceding paragraph, in which calcine from a dead roaster and calcine from the sulphation fluidized bed reactor are leached with dilute sulphuric acid solution(s) and the hot, strong sulphuric acid leach solution is recycled to the sulphation roaster.

The present invention will be more fully appreciated by the following detailed description of embodiments of the invention, referring to the accompanying diagrams, in which.

Figure 1:
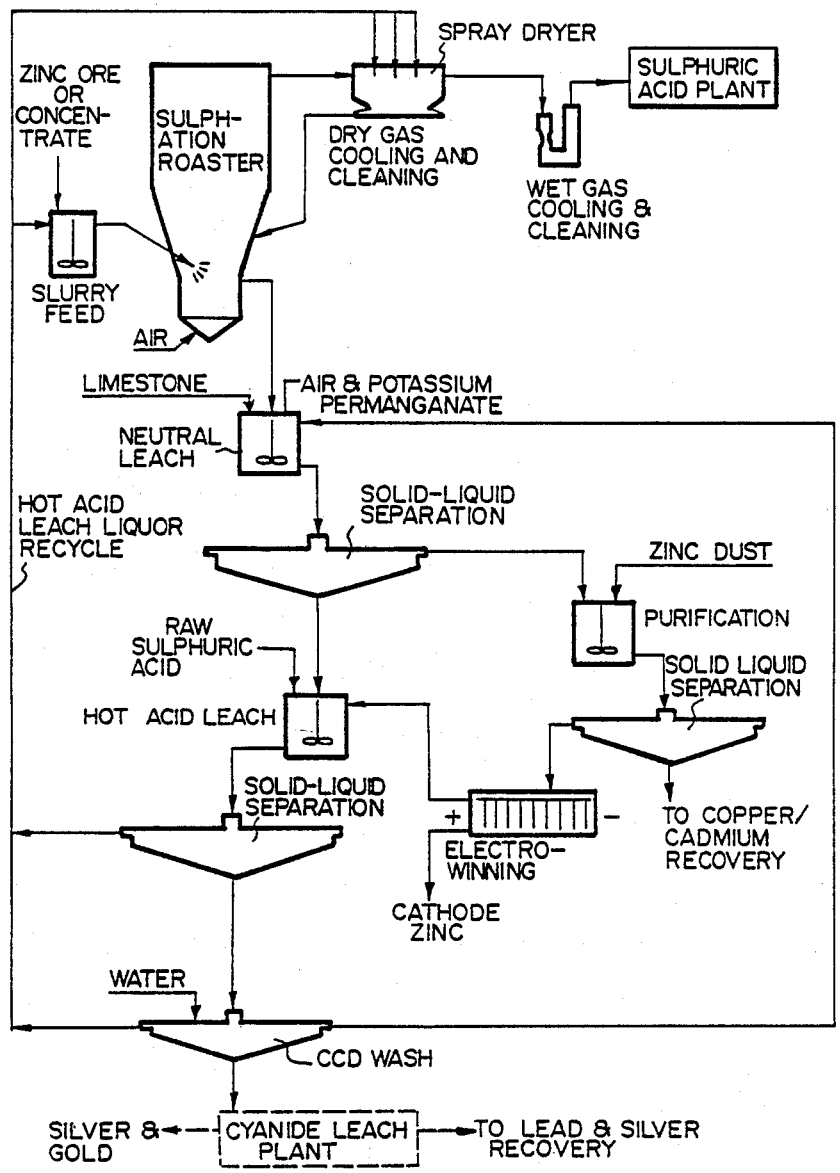
FIG. 1 is a schematic flow sheet illustrating an embodiment of the sulphation roasting process applied either directly to an ore or to a low grade zinc or bulk zinc-lead-copper-precious metal concentrate according to this invention.

In U.S. Pat. No. 4,224,122 the difficulties and complexities encountered in conventional electrolytic zinc plant practice of treating and separating the iron in solution after the ferrite residues are leached were shown to be substantially eliminated by thermal decomposition of the hot, strong sulphuric acid leach solution at 600°–750° C. in a fluidized bed reactor. Use was made of the excess heat produced from the oxidation and sulphation reactions of the ore or concentrate being roasted in the bed of this fluidized bed reactor. The zinc and other metals such as copper remain as solid sulphates and oxysulphates in the roaster calcines and can be recovered totally or in part with a water or dilute sulphuric acid leach. All iron sulphates in the strong acid leach solution are decomposed in the roaster to hematite and $SO_2$ and $SO_3$, and the sulphuric acid to $H_2O$, $SO_2$, and $SO_3$. The hematite remains inert in the subsequent water or dilute sulphuric acid leach and the hot strong acid leach.

The process as described in U.S. Pat. No. 4,224,122 relies on the excess heat generated in the roaster to thermally decompose all the hot strong acid leach solution and hot strong acid leach residue wash solutions while maintaining the temperature in the bed of the roaster at 600°–750° C. If there is insufficient excess heat available in the roaster some of the hot strong acid leach solution or wash liquor must be neutralized and discarded, resulting in losses of valuable metals such as zinc and copper. Efficient washing is required to reduce the soluble zinc and iron sulphate and sulphuric acid content of the hot strong acid leach residue to enable economic recovery of precious metals and lead. For ores and concentrates containing less than 20 weight percent combined acid soluble non-ferrous metal content or less than 30 weight percent total non-ferrous metal content the roaster generally produces insufficient excess heat to decompose all the hot strong acid leach solution and wash liquors even when excess heat production is maximized by predrying the ore or concentrate to very low, less than 1 weight percent, moisture contents. Similarly, some concentrates exhibit physical and chemical properties which result in the production of calcines, during fluidized bed roasting under sulphating conditions, containing greater than 15 percent of the zinc and zinc ferrite. Even when these concentrates contain greater than 30 weight percent zinc and excess heat is maximized by predrying there is insufficient excess heat in the bed of the roaster to decompose all the hot strong acid leach solution.

The present invention effects a significant increase in the utilization efficiency of the excess heat to the extent that ores directly (as mined); and very low grade concentrates; and ores and concentrates generating calcines containing up to 45 weight percent of the zinc and zinc ferrite; can all be processed economically by thermally decomposing all the hot, strong acid leach solution. Wash liquors may be thermally decomposed with excess heat generated in the roaster and/or recycled to the water or dilute sulphuric acid leach. Thus much more water may be employed in the washing of the hot, strong leach residue, resulting in lower zinc and iron sulphate and sulphuric acid contents of the residues and hence lower reagent costs in any subsequent precious metal or lead recovery steps. This enables the economic recovery of lead and precious metals which were previously too low to warrant recovery.

Referring now to FIG. 1, the zinc bearing ore or concentrate is fed to a fluidized bed reactor. This feeding may be accomplished by spraying as a slurry into the bed as shown in FIG. 1 or feeding directly as a filter cake or pneumatically in a dry sub-divided form.

Slurry feeding offers several advantages over dry or filter cake feeding. Firstly, when the process is situated nearby the mine or mill from which the ores or concentrates are received, slurry feeding would eliminate most of the expensive filtering and drying required for filter cake or dry feeding. Secondly, slurry feeding has been shown to result in the formation of calcine pellets in the bed of the roaster which result in a broader size distribution, better fluidization, and a lower calcine elutriation rate from the roaster thus resulting in higher metal recoveries. Although this pellet formation occurs with water and/or hot strong acid leach solution as slurry medium, the pellets exhibit better physical characteristics such as a slower attrition rate and contain lower ferrite contents when hot, strong acid leach solution is employed. These better fluidization characteristics aid in the treatment of high lead containing ores and concentrates.

In some cases, however, dry or filter cake feeding is preferred due to the generally lower ferrite content of calcines produced with these feed modes. Accordingly, when the potential energy content of the ore or concentrate is low thereby resulting in only small amounts of excess heat produced during roasting, and when the ore or concentrate roasting generates significant ferrite it may be necessary to partially dewater the ore or concentrate prior to roasting and feed as a filter cake or pneumatically dry, thus increasing the excess heat available for hot strong acid leach solution decomposition. In these cases, the hot strong acid leach solution would be introduced separately to the roaster in a sub-divided form.

The roasting is performed at a bed temperature between 620° and 700° C., with 20 to 60% excess air (oxygen) over the stoichiometric requirement, for a retention time of the calcine in the bed of greater than 1 hour, and at a superficial spacial velocity of gas within the bed of 25 to 150 cm per sec. The spacial velocity minimum is required to ensure adequate fluidization and prevent sintering of calcines containing high lead values. Spacial velocities greater than 150 cm per sec are not recommended due to high valuable metal losses due to elutriation of calcines from the reactor.

The temperature minimum is required to prevent the formation of excessive amounts of ferrous and/or ferric sulphates, maintain the kinetics of the sulphide roasting sufficiently fast so as to keep the retention time reasonably low, and ensure efficient conversion of the zinc sulphide minerals, namely sphalerite or marmatite, to zinc sulphate. The temperature maximum is required to prevent the formation of significant quantities of zinc ferrite incorporating zinc from the recycle hot, strong acid leach solution. Also, temperatures above 700° C. may result in bed sintering when high lead containing ore or concentrate is roasted.

The excess air requirement is kept above 20 percent to ensure sufficient air to maintain fluidization and ensure efficient sulphation of sulphides at reasonable retention times. Air in excess of 60 percent of stoichiometric will result in excessive dilution of the off-gass stream resulting in higher costs for gas cleaning, gas cooling, and sulphuric acid manufacture. Also, the zinc ferrite content of the calcine will increase with increasing excess air. Accordingly, the object of the roasting operation is to produce a calcine with maximum zinc and copper sulphate composition and minimum sulphide and iron sulphate composition, with maximum heat generation and $SO_2$ strength in the off-gas.

All calcines produced in the roasting operation are discharged directly from the bed by mechanisms such as bed overflow. This ensures control of retention time of calcines at the bed temperature resulting in high conversion of non-ferrous metal sulphides to sulphates; and iron sulphides and sulphates to hematite. This calcine is cooled reasonably quickly in an atmosphere from which roaster gas levels have been reduced by mechanisms such as rotary star valves, air locks, counter-current air flows etc. The calcine cooling can be accomplished by many devices, some examples of which are rotary coolers, fluidized bed coolers, and direct quenching in water or dilute sulphuric acid solution. These procedures are required to minimize the amount of hematite resulphation to iron sulphates.

The cooled calcines are leached in water or dilute sulphuric acid but generally dilute sulphuric acid. This operation referred to as a "Neutral Leach" is carried out under the following conditions: ambient temperature but not exceeding 80° C., pH 7.0 or lower throughout the leach, and for a retention time of not less than one-half hour. The pH at the termination of the leach must not be lower than 1.5 and preferrably higher than 3.5 to ensure the precipitation of most of the arsenic and most of the iron, which incomes as sulphates to the leach, as hydroxides and basic sulphates. This iron precipitation is required to purify the leach solution of metal ions injurious to the conventional solution purification and zinc recovery operations which follow. Accordingly, the object of the "Neutral Leach" operation is to maximize leaching and dissolution of zinc and copper sulphates and oxysulphates and minimize iron and arsenic leaching and dissolution.

The water or dilute sulphuric acid used in the leach can be from any of the following sources: recycled wash solution from the hot strong acid leach residue wash operation, recycled spent electrolyte from zinc electrowinning cells, recycled hot acid leach solution, or fresh or recycled water from within the plant. Preferably, all the water requirement for the leach is satisfied by wash solutions from the hot acid leach residue wash circuit, thus permitting maximum wash water usage and thus high washing efficiency. If this solution contains too much acid such that the final pH of the "Neutral Leach" is below the pH required for effective iron precipitation, then a neutralizing agent such as limestone, lime, or a calcine containing zinc oxide from a dead roasting operation must be added to raise the pH to the required value at termination. This situation will arise when sulphation roast calcines which contain low zinc oxysulphate and high iron sulphate values are leached and/or when the final pH requirement is above 3.5.

The pulp at termination of the "Neutral Leach" is subjected to a solid-liquid separation operation. This operation may be carried out in thickeners, clarifiers and/or filters but preferably by thickeners and/or clarifiers only. The solution is then treated by conventional processes for zinc, copper, and cadmium recovery.

The preferred pH at the termination of the "Neutral Leach" depends on the zinc to copper ratio in the ore or concentrate. For ratios above 30:1 the preferred pH will be greater than 3.5 thus ensuring iron precipitation to levels less than 20 mgpl in the leach solution. For ratios below 10:1 the preferred pH will be greater than 1.5 since a copper recovery operation such as cementation on scrap iron, solvent extraction and electrowinning, precipitation as copper sulphide, or direct electrowinning will be performed to recover copper before conventional zinc electrolyte purification with zinc dust. Final pH adjustment to greater than 3.5 which causes the precipitation of the remaining iron to less than 20 mgpl in the solution will occur in this case after copper recovery but prior to conventional zinc electrolyte purification.

The residue from the "Neutral Leach" in the form of a thickened pulp or filter cake is subjected to a hot, strong acid leach. This operation is carried out under the following range of conditions: temperature between 85° C. and the boiling point; free sulphuric acid concentration of 5–180 grams per liter throughout the leach; and retention time of greater than 0.5 hour. Preferred conditions are: temperature 95° C.; free sulphuric acid concentration of 25–40 grams per liter (pH 0.1–0.3) for 1.0–3.0 hour by addition of sulphuric acid followed by cessation of acid addition allowing the free acid concentration to decrease to less than 15 gpl at which time the leach is terminated. The object of this leach is to maximize zinc ferrite, copper ferrite, sphalerite, and chalcopyrite leaching and minimize hematite leaching and sulphuric acid consumption. Zinc sulphate, iron sulphates, and copper sulphate, which dissolve, and elemental sulphur which precipitates into the residue are the major products of the leach reactions.

The sulphuric acid required for the leaching operation is provided by spent electrolyte from the zinc electrowinning operation. Fresh sulphuric acid is added only if additional acid is required above what is available in the spent electrolyte. The leach pulp is subjected to solid-liquid separation in conventional apparatus such as thickeners, filters, centrifuges etc. The residue, either a filter cake or thickened pulp, is thoroughly washed of soluble sulphates with water, either fresh or recycled, by conventional methods such as counter-current decantation, displacement washing, or repulp washing.

Due to the procedures and conditions employed in the previous operations, most of the silver, gold, and lead contained in the ore or concentrate is now in a form, and contained in a residue which has favourable physical and chemical characteristics, for recovery by conventional methods. These methods include such techniques as cyanide leaching, brine leaching, and ammoniacal-ammonium sulphate leaching.

The hot, strong acid leach solution resulting from the solid-liquid separation step contains significant concentrations of zinc, iron, and copper sulphates and sulphuric acid. This solution, in whole or in part, is treated according to the method described in U.S. Pat. No. 4,224,122.

Accordingly, a major portion of this liquor is recycled to the sulphation roaster in which the zinc ore or concentrate is being roasted. As discussed previously, this liquor can either be sprayed into the roaster in a subdivided form separately from the ore or concentrate feed or slurried with this feed before introduction to the roaster. The zinc and copper in the solution reports the zinc sulphate and copper sulphate in the calcine and the iron sulphates as hematite in the calcine.

Any hot, strong acid leach solution surplus to the quantity for which excess heat is available in the bed for decomposition is sent to a spray dryer situated in the hot roaster off-gas train. The gas incoming to the spray dryer may or may not have been partially cleaned of elutriated calcine in cyclones prior to entering the spray dryer. Any calcines collected in cyclones is recirculated to the sulphation roaster. The gas, however, has been kept as hot as possible and is at a temperature above 500° C. and preferably above 600° C. at the entrance to the spray dryer. The gas temperature exiting the dryer is maintained above 300° C. Zinc, copper, and most of the iron in the solution sprayed in a subdivided form into the spray dryer are recovered as dry sulphates in the dryer settling chamber or in cyclones following the dryer.

Water evaporates into the off-gas, and sulphuric acid decomposes to $SO_2$, $SO_3$, and gaseous $H_2O$. Some of the iron sulphates may thermally decompose to hematite, $SO_2$ and $SO_3$. The settling chamber and spray dryer cyclones also collect a significant percentage of elutriated roaster calcines, thus effecting higher metal recoveries. All the material collected in the spray dryer and cyclones is recirculated either directly to the sulphation roaster or to slurry feed tanks to be blended with the ore or concentrate and hot, strong acid recycle solution. The iron sulphates thermally decompose to hematite in the bed of the sulphation roaster. In this manner, effective use has been made of both the excess heat available in the bed of the sulphation roaster and all recoverable heat contained in the roaster off-gas.

The temperature of off-gas exiting the spray dryer must be maintained above 300° C. to prevent formation of metal sulphate hydrates, condensation of sulphuric acid, and condensation of volatile impurities such as mercury, chlorine, and fluorine.

Wash solution from the hot, strong acid leach residue wash operation is recirculated to the neutral leach as discussed previously and/or to the spray dryer for thermal decomposition and hence recovery of contained zinc and copper through reactions similar to those discussed above for the hot acid leach liquor.

In some cases, where sufficient heat is generated within the bed of the sulphation roaster, all the hot, strong acid leach liquor and wash solution maybe thermally treated directly in the roaster. In these cases, the spray dryer may be substituted by conventional waste heat recovery and gas cleaning equipment such as waste heat boilers, cyclones, electrostatic precipitators, and hot gas filters.

Alternatively for these cases, most of all the hot acid leach liquor and wash liquor may be recycled to the spray dryer to provide the required cooling requirement and the remainder, if any, recycled directly to the roaster. The excess heat generated in the roaster bed may be recovered by bed coils, thus producing steam for use in the leaching and purification operations.

Figure 2:
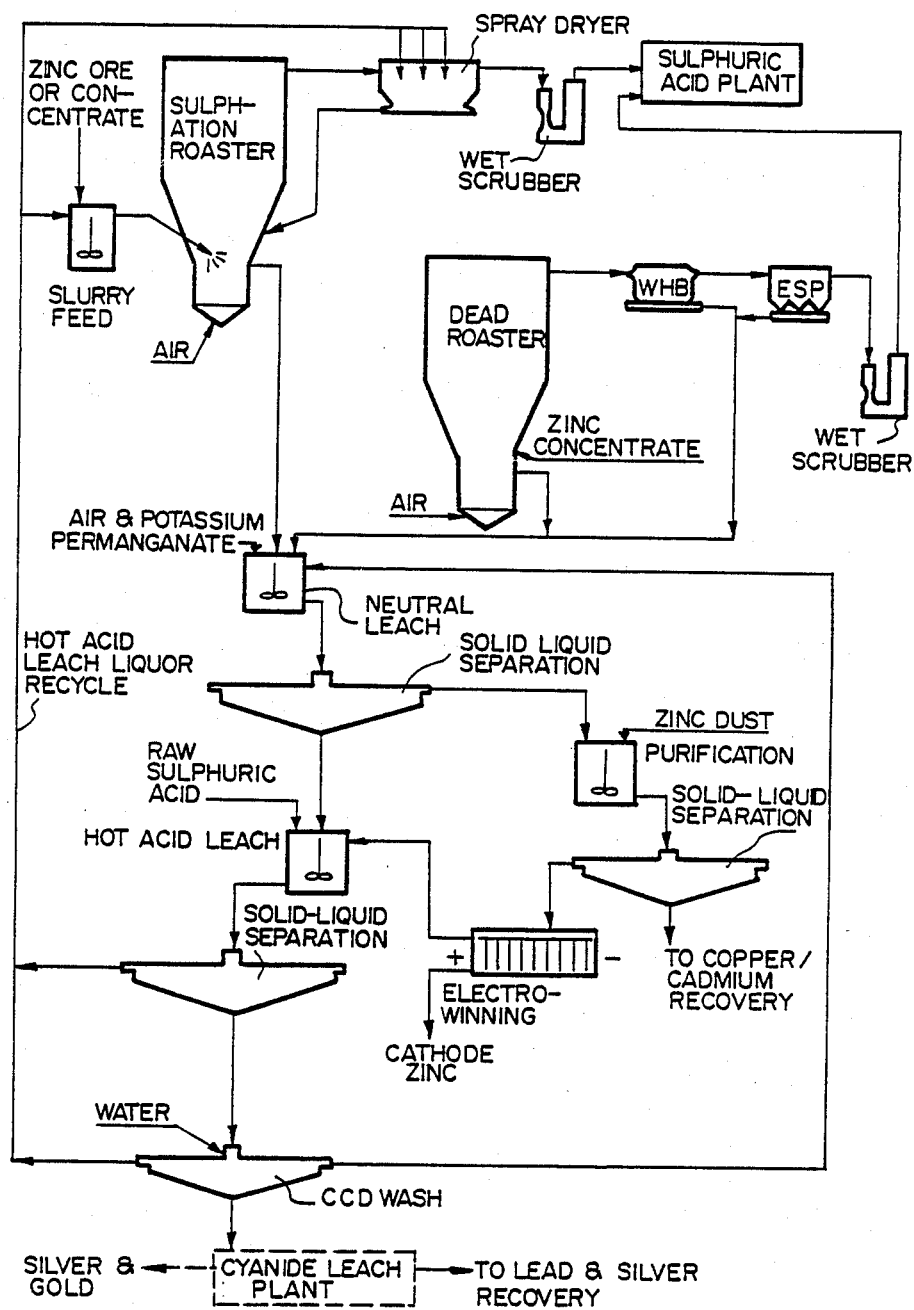
FIG. 2 is a schematic flow sheet illustrating an embodiment of the integrated sulphation roasting and dead roasting processes applied to an ore or a low grade zinc-bearing concentrate or bulk concentrate and a high grade zinc concentrate, respectively, according to this invention.

Referring to FIG. 2, the simplicity of integration of the present invention with a conventional dead roasting operation treating a relatively high grade zinc concentrate is shown. The zinc oxide produced in the dead roaster serves as the neutralization agent in the "Neutral Leach", thus decreasing the reagent costs and resulting in a hot, strong acid leach residue of higher grade in silver, gold, and lead than if lime or limestone were employed as neutralizing agent forming gypsum which precipitates into the residue. All zinc and copper ferrites and sulphides present in the dead roast calcine are treated in the hot, strong acid leach, the leach liquor from which is all sent to the sulphation roaster and/or spray dryer for thermal decomposition. In this manner, all the iron entering the plant, in both feeds to the sulphation roaster and dead roaster, exits the process as hematite in the hot, strong acid leach residue. Also, lead and precious metals, contained in the zinc concentrate treated in the dead roaster, are recoverable from the hot, strong acid leach residue.

EXAMPLE NO. 1

Application to a Sulphation
Roast-Leach-Electrowinning Process for Zinc
Containing Ores An ore assaying 6.3% Zn, 3.0% Pb, 0.4% Cu, 38.6% Fe, 2.0 oz/mt Ag, and 0.04 oz/mt Au with principal mineral components being sphalerite, galena, chalcopyrite, and pyrite, was roasted in a continuous semi-pilot fluid-bed reactor at a rate of 150–380 kg/day of dry feed under conditions where zinc, lead, and copper are selectively sulphated and iron forms the oxide hematite. Sulphation roasting was carried out at temperatures between 620° and 700° C. with air between 20 and 60% excess over stoichiometric for retention times between 1.0 and 6.0 hours. Superficial velocities of gas within the bed were calculated to be 25–100 cm/sec, controlled by the retention time, feed rate, and excess air settings for the test. The roaster was equipped with cyclones and a spray dryer chamber for collecting elutriated calcines from the off gases and recycling these to the roaster. The cleaned gases were cooled and neutralized in a wet scrubber. Calcines from the overflow were leached continuously with dilute sulphuric acid solution at ambient temperature, 1.5 hours retention time at ambient pH which was less than 4.0. The dilute sulphuric acid solution used in the leach was produced as wash solution from repulp washing of hot, strong acid leach residue. After 1.5 hours leaching time, limestone and potassium permanganate were added to the leach pulp to increase the pH to 3.6–4.0 and oxidize ferrous ion to ferric and precipitate ferric ion as iron hydroxide.

After pH adjustment the leach pulp was thickened, the clear supernate decanted, and the thickened pulp leached in hot strong sulphuric acid. This acid was contained in a solution of 150 gpl sulphuric acid, approximating the acid content of spent electrolyte from zinc electrowinning cells. The leach was conducted for 2 hours at 95° C. at a pH maintained at less than 0.3 by continuous addition of the acid solution. After 2 hours, acid addition was terminated and the pH was allowed to climb to 0.4–0.6 which took about 1 hour. At this point the pulp was filtered hot, producing a wet filter cake and a hot, strong acid leach solution. This solution was recycled in part to the roaster, as a fine spray.

The hot acid leach residue was repulped washed in fresh water and refiltered to produce a wash solution and a washed leach residue. Sufficient wash water was employed so as to provide wash solution for the dilute sulphuric acid leach to satisfy the water requirement such that the dilute acid leach supernate contained 150 gpl zinc and to provide excess wash solution which when mixed with hot acid leach solution, excess to roaster cooling requirements and sprayed into a spray dryer, was sufficient to cool the roaster off gas to 325° C. All calcines exiting the spray dryer were recycled to the sulphation roaster.

The washed hot acid leach residue was repulped in water, pH adjusted with lime, and the silver and gold recovered by leaching with sodium cyanide. Techniques employed were entirely conventional.

Residue from the cyanide leach was then leached in a saturated $NaCl$-$CaCl_2$ brine extracting the remaining lead and silver from the hematite residue.

The results are summarized as shown below on Tables I and II.

TABLE I

Results of Tests at 40% Excess Air and 3 hours Retention Time in the Roaster

| Roasting Temperature | Gas Velocity (cm/sec.) | Zinc Losses To Scrubber (%) | Zinc Recovery into Dilute Acid Leach supernate (%) | Zinc Losses to Hot Strong Acid Leach Residue (%) | Lead Content of Hot, Strong Acid Leach Residue (wt %) |
|---|---|---|---|---|---|
| 620 | 30 | 5.0 | 90.3 | 4.5 | 2.9 |
| 650 | 34 | 5.2 | 91.1 | 3.4 | 4.8 |
| 685 | 35 | 5.3 | 92.0 | 2.5 | 4.5 |
| 685 | 85 | 8.0 | 89.4 | 2.6 | 4.6 |
| 700 | 35 | 4.8 | 91.8 | 3.2 | 2.7 |

TABLE II

Results of Tests at 685° C. Roasting Temperature

| Air Excess (%) | Gas Velocity (cm/sec.) | Roast Retention Time (hours) | Zinc Losses to Scrubber (%) | Zinc Losses to Hot, Strong Acid Leach Residue (%) | Zinc Recovery into Dilute Acid Leach supernate (%) | $SO_2$ Content of Off-Gases (Vol % dry-basis) |
|---|---|---|---|---|---|---|
| 20 | 30 | 3 | 4.7 | 3.1 | 91.9 | 11.8 |
| 40 | 105 | 1 | 8.2 | 3.0 | 88.8 | 10.1 |
| 40 | 35 | 3 | 5.3 | 2.5 | 92.0 | 10.4 |
| 60 | 40 | 3 | 5.3 | 2.8 | 91.6 | 9.1 |

Silver and gold extractions in the cyanide leach ranged between 53–58% and 60–69% respectively and appeared to be independent of the roasting conditions studied.
Lead extractions into the brine solution were 87–93%.
Silver extractions were 40–70% of the silver remaining after cyanide leaching.
Copper recoveries into the dilute acid leach supernate were similar to zinc recoveries in the range of 87–91%.

EXAMPLE NO. 2

Application to a Sulphation Roast-Leach-Electrowinning Process for Zinc Containing Ores, Slurry Fed to the Roaster An ore exactly similar to Example 1 was slurried to 70 wt% in water and treated in a manner similar to Example 1. Sulphation roasting conditions were fixed at 685° C., 40% excess air over stoichiometric, 3.2 hours retention time, and superficial velocity of 85 cm/sec. Leaching procedures and conditions were identical to Example 1. The major departure from Example 1 was in the recycle of the hot, strong acid leach solution and the calcine produced and collected in the spray dryer. That part of the hot, strong acid leach solution which was recycled directly to the roaster as a spray in Example 1 was mixed with the slurry feed in this test. Also, the spray dryer calcine was recycled to the slurry feed tank and slurried with the feed prior to introduction into the roaster. The results are summarized as follows:

Zinc loss to the scrubber: 1.8%.
Zinc loss to the hot, strong acid leach residue: 3.2%
Zinc recovery to the dilute acid leach supernate: 95.0%
Lead content of the hot, strong acid leach residue: 3.9 wt%
$SO_2$ content of the roaster off-gas (dry basis): 10.4 vol%
Copper recovery to the dilute acid leach supernate: 91.0%
Silver recovery in the cyanide leach: 61.8%
Gold recovery in the cyanide leach: 68.9%
Lead recovery in the brine leach: 93.0%

Silver recovery from the cyanide leach residue in the brine leach: 60.0%

EXAMPLE NO. 3

Application to a Sulphation Roast-Leach Electrowinning Process for a Bulk Zinc-Lead-Copper-Silver Concentrate A bulk concentrate assaying 30.0% Zn, 9.0% Pb, 8.0% Cu, 18.2% Fe, 7.9 oz/mt Ag, 0.02 oz/mt Au with principal mineral components being sphalerite, galena, chalcopyrite, and pyrite, was processed in a manner exactly similar to Example No. 2 excepting gold values did not warrant inclusion of a cyanide leach stage. For purposes of comparison, tests were also performed with dry feeding as in Example 1 and also at a low superficial velocity of 25 cm/sec.

The results are summerized as follows:

Test #1: Slurry Feeding—85 cm/sec superfical velocity
Zinc loss to the scrubber: 1.3%
Zinc loss to the hot, strong acid leach residue: 3.0%
Zinc recovery to the dilute acid leach supernate: 95.6%
Lead content of the hot, strong acid leach residue: 15.7 wt%
$SO_2$ content of the roaster off-gas (dry basis): 4.7 vol%
Copper recovery to the dilute acid leach supernate: 93.2%
Lead recovery in the brine leach: 97.7%
Silver recovery in the brine leach: 82.3%

Test #2: Dry Feeding—85 cm/sec superficial velocity
Zinc loss to the scrubber: 6.8%
Zinc loss to the hot, strong acid leach residue: 2.6%
Zinc recovery to the dilute acid leach supernate: 90.2%
Lead content of the hot, strong acid leach residue: 20.3 wt%
$SO_2$ content of the roaster off-gas (dry basis): 4.5 vol%
Copper recovery to the dilute acid leach supernate: 89.1%
Lead recovery in the brine leach: 91.2%
Silver recovery in the brine leach: 79.1%

Test #3: Dry Feeding—25 cm/sec superficial velocity
Zinc loss to the scrubber: 4.3%
Zinc loss to the hot, strong acid leach residue: 3.9%
Zinc recovery to the dilute acid leach supernate: 91.8%
Lead content of the hot, strong acid leach residue: 18.3 wt%
$SO_2$ content of the roaster off-gas (dry basis): 4.8 vol%
Copper recovery to the dilute acid leach supernate: 90.1%
Lead recovery in the brine leach: 92.2%
Silver recovery in the brine leach: 77.0%

In Test #3, problems were experienced with bed fluidization in the sulphation roaster due to calcine sintering after about 10 hours running indicating insufficient superficial velocity for this bulk concentrate when fed dry.

EXAMPLE NO. 4

Application to a Sulphation Roaster-Leach-Electrowinning Process for Zinc-Lead Bulk Concentrates A concentrate assaying 29.6% Zn, 25.1% Pb, 0.4% Cu, 9.4% Fe, 28.1 OZ/Mt Ag, and 0.3 OZ/Mt Au with principal mineral components being sphalerite, galena, chalcopyrite, and pyrite was processed in a manner exactly similar to Example 2, excepting no cyanide leach or brine leach was performed on the hot, strong acid leach residue since the lead grade was sufficiently high to qualify the residue as a high grade lead concentrate suitable for conventional lead smelters.

The results are summarized as follows:
Zinc loss to the scrubber: 1.5%
Zinc loss to the hot, strong acid leach residue: 1.2%
Zinc recovery to the dilute acid leach supernate: 97.3%
Lead content of the hot, strong acid leach residue: 49.1 wt%
$SO_2$ content of the roaster off-gas (dry basis): 1.8 vol%
Copper recovery to the dilute acid leach supernate: 97.5%
Silver content of the hot, strong acid leach residue: 54.9 OZ/MT
Gold content of the hot, strong acid leach residue: 0.6 OZ/MT It was determined during this test that if superficial velocities were decreased below 35 cm/sec, accretions would develop on the walls of the sulphation roaster. This resulted in increased losses to the scrubber and unfavourable effects on bed fluidization resulting in eventual collapse.

We claim:

1. In a method for recovering zinc from material selected from the group consisting of sulphidic ores and concentrates and for rendering copper, lead, silver, and gold in said material more readily recoverable, the improvement comprising:

(a) roasting said material in a subdivided form in a fluidized bed reactor at a temperature from 620° to 700° C., with 20–60% excess air over the stoichiometric for an average retention time of over 1 hour at a superficial spacial velocity of the gas within the bed of 25–150 cm per sec at reactor temperature resulting in an atmosphere comprising $SO_2$, $SO_3$, water vapour, and remaining $O_2$ and $N_2$ from the air, to obtain a calcine containing zinc and copper as sulphates and oxysulphates, ferrites, oxides, and unreacted sulphides, iron as hematite, and lead, silver, and gold in forms amenable to recovery;

(b) leaching said calcine with water or dilute sulphuric acid solution at a temperature below 80° C. in such a manner that sulphates, oxysulphates, and oxides of zinc and copper are leached out from the calcine into the water or dilute sulphuric acid solution;

(c) subjecting the leach pulp resulting from step (b) to a liquid-solid separation step to yield a leach solution from which zinc and copper can be recovered;

(d) leaching the solid residue resulting from step (c) with hot, strong sulphuric acid solutions, at a temperature above 80° C. but below the boiling point of the solution and with sulphuric acid solution stronger than used in step (b), in such a manner that zinc and copper ferrites and unreacted sulphides of zinc and copper are converted to sulphates of iron, copper, and zinc which dissolve in the leach solution;

(e) subjecting the pulp resulting from step (d) to a solid-liquid separation step to obtain a leach solution containing said sulphates of iron, copper, and zinc;

(f) recycling said sulphates of zinc, copper, and iron obtained in step (e) in part into said fluidized bed reactor in a subdivided form to convert the sulphates of iron to hematite, $SO_2$ and $SO_3$ and render the sulphates of zinc and copper to the calcine for recovery by means of steps (b) and (c);

(g) washing the solid residue resulting from step (e) with water;

(h) subjecting any pulp resulting from step (g) to a solid-liquid separation step to obtain a washed leach residue containing lead, silver and gold in forms amenable to recovery and a wash liquor containing zinc, copper, and iron sulphates and sulphuric acid; and (i) recycling said wash liquor resulting from step (h) in part to step (b) and/or in part to said fluidized bed reactor in a subdivided form to convert the sulphates of iron to hematite, $SO_2$ and $SO_3$ and enable recovery of the sulphates of zinc and copper by means of steps (b) and (c).

2. The method as defined in claim 1 wherein the ore or concentrate is introduced into the fluidized bed reactor as a slurry.

3. The method as defined in claim 1 wherein the ore or concentrate is introduced into the fluidized bed reactor as a filter cake.

4. The method as defined in claim 1 wherein dry ore or concentrate is introduced pneumatically into the fluidized bed reactor.

5. The method as defined in claim 1 wherein the wash liquor resulting from step (h) is recycled to step (b).

6. The method as defined in claim 1 wherein the sulphates of iron and zinc obtained in step (e) are mixed in whole or in part, with the ore or concentrate and introduced into the fluidized bed reactor as a slurry.

7. The method as defined in claim 1 wherein off gas from the fluidized bed reactor is fed to a $H_2SO_4$ plant.

8. The method as defined in claim 1 wherein off gas from the fluidized bed reactor is fed to a spray dryer.

9. The method as defined in claim 1 wherein off gas from the fluidized bed reactor is fed to a spray dryer, and wherein off gas from the spray dryer is fed to a $H_2SO_4$ plant.

10. The method as defined in claim 1 wherein part of the sulphates of iron and zinc obtained in step (e) are dryed in a spray dryer, fuelled by off gas from the fluidized bed reactor, prior to recycle to the fluidized bed reactor.

11. The method as defined in claim 10 wherein the sulphates of zinc and iron are slurried with the ore or concentrate before introduction into the fluidized bed reactor.

12. The method as defined in claim 10 wherein the sulphates of zinc and iron are introduced into the fluidized bed reactor in a dry form.

13. The method as defined in claim 10 wherein said the temperature of the gas phase in the spray dryer is maintained above 300° C.

14. The method as defined in claim 1 wherein part of the wash liquor resulting from step (h) is dried in a spray dryer, fuelled by off gas from the fluidized bed reactor, prior to recycle of the sulphates of zinc and iron to the fluidized bed reactor.

15. The method as defined in claim 1 wherein said sulphation roasting is carried out at 685° C., with 40% excess air (oxygen), for an average retention time of 3 hours, and at a superficial spacial velocity of gas within the roaster of 50–100 cm/sec.

16. The method as defined in claim 1 wherein the step (b) is carried out such that the pH of the pulp at the termination of the leach is between 3.6 and 5.2.

17. The method as defined in claim 1 wherein the step (d) is carried out at a pH of less than 0.3, at a temperature of 95° C., for greater than 2.0 hours.

18. The method as defined in claim 1 wherein calcine from a dead roaster is leached in step (b) along with the calcine from the fluidized bed sulphation reactor.

19. The method as defined in claim 1 wherein zinc and copper are recovered from the leach solution resulting from step (c).

20. The method as defined in claim 1 wherein zinc is recovered from the leach solution resulting from step (c).

21. The method as defined in claim 1 wherein lead, silver, and gold are recovered from the washed leach residue resulting from step (h).

22. The method as defined in claim 1 wherein lead is recovered from the washed leach residue resulting from step (h).

23. The method as defined in claim 1 wherein silver and gold are recovered from the washed leach residue resulting from step (h).

24. The method as defined in claim 1 wherein the wash water for step (g) is recycled water or solution.

25. The method as defined in claim 1 wherein said sulphation roasting is carried out at 660°–690° C., with 30–45% excess air (oxygen), for an average retention time of 2–4 hours, and at a superficial spacial velocity of gas within the roaster of 40–100 cm/sec.

* * * * *